United States Patent Office 2,894,011
Patented July 7, 1959

2,894,011

PRODUCTION OF CONJUGATED-UNSATURATED ALDEHYDO CARBOXYLIC ACID ESTERS

Horst Pommer, Ludwigshafen (Rhine), Germany, assignor to Badische Anilin- & Soda-Fabrik Aktiengesellschaft, Ludwigshafen (Rhine), Germany No Drawing. Application January 17, 1956
Serial No. 559,517

Claims priority, application Germany January 25, 1955

8 Claims. (Cl. 260—410.9)

This invention relates to a process for the production of valuable conjugated-unsaturated aldehydo carboxylic acid esters, especially of 4-methylhexadiene-(2.4)-al-(1)-acid-(6) and 2.6-dimethyloctatriene-(2.4.6)-al-(1)-acid-(8) lower alkyl esters.

I have found that conjugated-unsaturated aldehydo carboxylic acid esters are obtained by reacting, while excluding water, aldehydo carboxylic acid esters of the general formula $$R'OOC-(CH=C)_m-(CH-CH)_n-CH=O$$
$$\qquad\qquad\quad | \qquad\quad | \quad |$$
$$\qquad\qquad\quad R \qquad\;\; OR'\; R$$

in which $m$ and $n$ are 0 or 1 or 2 and the sum of $m$ and $n$ is 1, 2 or 3, R represents hydrogen or a lower alkyl group and R' a lower alkyl group, or the lower dialkyl acetals of said aldehydo carboxylic acid esters, in the presence of acid condensing agents with a vinyl ether of the general formula $$R-CH=CH-OR'$$

in which R and R' have the same meaning as above and heating the resultant alkoxy aldehydo carboxylic acid esters or their dialkyl acetals with small amounts of water and an acid until no more alcohol is split off. There are used at least one molecule of water up to about 10 molecules. The water is preferably added by small portions during the heating, advantageously in the presence of benzene or toluene.

Suitable initial aldehydo carboxylic acid esters are, for example, the 2- or 4-methylbutene-(2)-al-(1)-acid-(4) methyl, ethyl or butyl esters or their dimethyl or diethyl acetals, the 1.1.3-trimethoxy- or -triethoxy-4-methylhexene-(4)-acid-(6) methyl or ethyl esters or the 1.1.3-triethoxyhexene-(4)-acid-(6) ethyl ester.

Suitable vinyl ethers are, for example, the vinyl or propenyl methyl, ethyl or propyl ethers.

As acid condensing agents there may be used, for example, hydrogen halides, such as hydrogen fluoride, chloride and bromide, boron trifluoride, benzene or p-toluene sulfonic acid or zinc chloride. They can be used in an amount of from about 0.05 to about 10 percent with reference to the amount of reactants. The same acid agents may be used in the last step of the process, i.e. in the splitting off of alcohol.

In the case of using the diethyl acetal of 2-methyl-butene-(2)-al-(1)-acid-(4) ethyl ester (I) and vinyl ethyl ether (II) as starting materials, the process may be formulated as follows:

$$H_5C_2OOC-CH=C-CH(OC_2H_5)_2 + CH_2=CH-OC_2H_5$$
$$\qquad\qquad\qquad\;\; |$$
$$\qquad\qquad\qquad\;\; CH_3$$
$$\qquad\quad I. \qquad\qquad\qquad\qquad\qquad II.$$

$$\downarrow acid$$

$$H_5C_2OOC-CH=C-CH-CH_2-CH(OC_2H_5)_2$$
$$\qquad\qquad\qquad\; | \quad\; |$$
$$\qquad\qquad\qquad\; CH_3\; OC_2H_5$$
III.

$$\downarrow H_2O, acid$$

$$H_5C_2OOC-CH=C-CH=CH-CH=O + 3C_2H_5OH$$
$$\qquad\qquad\qquad\; |$$
$$\qquad\qquad\qquad\; CH_3$$
IV.

If the ester III and propenyl ethyl ether (V) are used as the starting materials, the process may be formulated as follows:

$$H_5C_2OOC-CH=C-CH-CH_2-CH(OC_2H_5)_2 + CH_3-CH=CH-OC_2H_5$$
$$\qquad\qquad\qquad\;\; |\quad\;\; |$$
$$\qquad\qquad\qquad\;\; CH_3\; OC_2H_5$$
III. \qquad\qquad\qquad\qquad\qquad\qquad\qquad V.

$$\downarrow acid$$

$$H_5C_2OOC-CH=C-CH-CH_2-CH-CH-CH(OC_2H_5)_2$$
$$\qquad\qquad\qquad\; | \quad\; | \qquad\;\; | \quad\; |$$
$$\qquad\qquad\qquad\; CH_3\; OC_2H_5\; OC_2H_5\; CH_3$$
VI.

$$\downarrow acid, H_2O$$

$$H_5C_2OOC-CH=C-CH=CH-CH=C-CH=O + 4C_2H_5OH$$
$$\qquad\qquad\qquad\; | \qquad\qquad\qquad\quad |$$
$$\qquad\qquad\qquad\; CH_3 \qquad\qquad\qquad\;\; CH_3$$
VII.

In this way for example the hitherto unknown 4-methylhexadiene-(2.4)-al-(1)-acid-(6) ethyl ester IV is obtained by way of the singly unsaturated monoethoxy diethylacetal carboxylic acid ester III and the 2.6-dimethyloctatriene-(2.4.6)-al-(1)-acid-(8)-ethyl ester VII by way of the singly unsaturated diethoxy diethylacetal carboxylic acid ester VI.

The conjugated unsaturated aldehydo carboxylic acid esters obtainable by the present process starting from technically accessible materials are valuable intermediates for synthesis of vitamins and vitamin-like compounds.

The following examples will further illustrate the invention but the invention is not restricted to these examples. The parts are parts by weight.

*Example 1*

100 parts of 2-methyl-butene-(2)-al-(1)-acid-(4) ethyl ester of the boiling point 79° to 81° C. at 11 Torr (obtainable by oxidation of omega-hydroxy-beta.beta-dimethylacrylic acid ethyl ester or by condensation of propionaldehyde with glyoxylic acid ethyl ester) are acetalized by stirring it with 110 parts of absolute alcohol, 3 parts of ammonium nitrate and 180 parts of orthoformic acid ethyl ester for 15 hours at room temperature and then for 10 minutes at 70° C. The 1.1-diethoxy-2-methyl-butene-(2)-acid-(4) ethyl ester thus obtained in a yield of 206 parts boils at 88° to 91° C. at 0.7 Torr.

To 205 parts of this acetal ester there are added 0.25 part of boron fluoride etherate and then, at 40° to 45° C., 40 parts of vinyl ethyl ether while stirring. After neutralization with potassium carbonate, the whole is fractionally distilled; 90 parts of initial material first pass over and then 130 parts of 1.1.3-triethoxy-4-methylhexene(4)-acid-(6) ethyl ester of the boiling point 110° to 113° C. at 0.4 Torr are obtained.

20 parts of this ester are heated with 600 parts of benzene, 5 parts of water and 0.2 part of p-toluene sulfonic acid with continuous reflux of the benzene until a transition temperature of 80° C. has been reached. The remaining benzene solution is washed with 2 percent potassium carbonate solution and then with water, dried over sodium sulfate and the benzene evaporated. There are obtained 18 parts of 4-methyl-hexadiene-(2.4)-al-(1)-acid-(6) ethyl ester melting at 57° C. (recrystallized from cyclohexane) which in methanol solution exhibits a band with $\lambda_{max}=272$ millimicrons, $\epsilon=27,000$. The corresponding n-butyl ester prepared in an analogous manner has the boiling point 88° to 91° C. under a pressure of 0.001 Torr.

*Example 2*

To 128 parts of 1.1.3-triethoxy-4-methylhexene-(4)-acid-(6)-ethyl ester obtained as described in the second paragraph of Example 1 there are added 0.8 part of boron fluoride etherate and then, at 50° to 55° C., 35 parts of propenyl ethyl ether. Fractional distillation yields 91 parts of initial material and 34 parts of 1.1.3.5-tetraethoxy-2.6-dimethyl-octene-(6)-acid-(8) ethyl ester of the boiling point 160° to 165° C. at 0.05 Torr.

34 parts of this compound are heated with 600 parts of benzene, 5 parts of water and 0.2 part of para-toluene sulfonic acid with continuous return of the benzene until a transition temperature of 80° C. has been reached. The remaining benzene solution is shaken with 2 percent potassium carbonate solution and then with water, dried over sodium sulfate and the solvent evaporated. The residue is distilled at a pressure of 0.003 Torr and a bath temperature of 120° C.

The 2.6-dimethyl-octatriene-(2.4.6)-al-(1)-acid-(8) ethyl ester thus obtained solidifies and upon recrystallization from cyclohexane gives yellowish needles melting at 78° C. When taken up in methanol its absorption spectrum shows the following bands: $\lambda_{max}=300$ millimicrons (inflection), $\epsilon=29,000$; 315 millimicrons, $\epsilon=48,000$; and 327 millimicron, $\epsilon=40,000$.

*Example 3*

To a solution of 250 parts of 4-methyl-hexadiene-(2.4)-al-(1)-acid-(6) ethyl ester (obtained by the method described in Example 1) in 230 parts of orthoformic acid ethyl ester there is added a warm solution of 1.4 parts of ammonium nitrate in 140 parts of absolute ethanol. After boiling for 1 hour under reflux, the dark colored solution is diluted with methylene chloride and washed with dilute sodium carbonate solution. After drying over sodium sulfate, the solvent and excess ethyl orthoformate are distilled off. In the subsequent fractional distillation in high vacuum, 300 parts of 1.1-diethoxy-4-methyl-hexadiene-(2.4)-acid-(6) ethyl ester of the boiling point 97°–98° C. at 0.05 Torr pass over. To this there are added 0.4 part of boron trifluoride dietherate and, gradually at 50° to 55° C. 100 parts of propenyl ethyl ether. Care is taken by temporary cooling that the said temperature is not exceeded. When all has been added, the whole is stirred for 30 minutes, cooled and neutralized with dibutylamine. The 1.1.3-triethoxy-2.6-dimethyl-octadiene-(4.6)-acid-(8) ethyl ester thus obtained boils at 126° to 128° C. at 0.01 Torr; the yield is 330 parts. This triethoxy carboxylic acid ester is reacted in toluene solution with small amounts of water with the addition of para-toluene sulfonic acid as described in the second paragraph of Example 2. 180 parts of 2.6-dimethyl-octatriene-(2.4.6)-al-(1)-acid-(8) ethyl ester of the melting point 78° C. are thus obtained.

*Example 4*

To 200 parts of 2-methyl-butene-(2)-al-(1)-acid-(4) ethyl ester there are added 0.4 part of boron trifluoride dietherate and then, at 45° C., 60 parts of vinyl ethyl ether. The neutralized reaction product is dissolved in 300 parts of toluene and treated with para-toluene sulfonic acid as described in the last paragraph of Example 1. As soon as no further splitting off of alcohol takes place, the solvent is distilled off and the residue fractionally distilled in vacuo, whereby there pass over 120 parts of unchanged initial material and 60 parts of 4-methyl-hexadiene-(2.4)-al-(1)-acid-(6) ethyl ester of the boiling point 87° to 89° C. at 0.07 Torr, which immediately crystallizes and melts at 57° C. after being once recrystallized from cyclohexane.

I claim:

1. A conjugated-unsaturated aldehydo carboxylic acid alkyl ester of the general formula

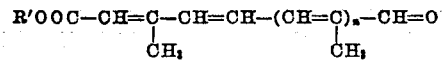

in which R' represents a lower alkyl group and $n$ represents a number selected from zero and one.

2. A process for the production of a conjugated-unsaturated aldehydo carboxylic acid alkyl ester of the general formula

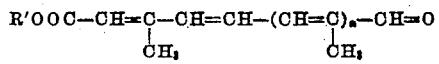

in which R' represents a lower alkyl group and $n$ represents a number selected from zero and one, which process comprises adding while excluding water a vinyl ether of the general formula R—CH=CH—OR' in which R in a member of the group consisting of hydrogen and methyl and R' is a lower alkyl group in the presence of an acid catalyst selected from the class consisting of hydrogen halides, boron trifluoride, sulfonic acids of the benzene series and zinc chloride to an ester of the general formula

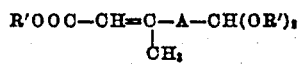

in which R' represents a lower alkyl group and A stands for a member of the class consisting of a direct link and a —CH=CH— and a —CH(OR')—CH$_2$— group, R' having the same meaning as above, and heating the resultant addition product with about the equivalent amount of water and a sulfonic acid of the benzene series until no more alcohol of the general formula R'OH is split off.

3. 2.6 - dimethyl - octatriene-(2.4.6)-al-(1)-acid-(8)-ethyl ester.

4. 4 - methyl - hexadiene - (2.4)-al-(1)-acid-(6) ethyl ester.

5. 4 - methylhexadiene - (2.4)-al-(1)-acid-(6) n-butyl ester.

6. A process for the production of 4-methyl-hexadiene-(2.4)-al-(1)-acid-(6) ethyl ester which consists in adding while excluding water vinyl ethyl ether into a mixture of 1.1 - diethoxy - 2-methylbutene-(2)-acid-(4) ethyl ester and about 1 percent of boron trifluoride etherate and heating the 1.1.3-triethoxy-4-methylhexene-(4)-acid-(6) ethyl ester thus obtained with benzene and about one molecule of water in the presence of a sulfonic acid of the benzene series until no more alcohol is split off.

7. A process for the production of 2.6-dimethyl-octatriene-(2.4.6)-al-(1)-acid-(8) ethyl ester which consists in adding while excluding water propenyl ethyl ether into a mixture of 1.1.3-triethoxy-4-methyl hexene-(4)-acid-(6) ethyl ester and about one percent of boron trifluoride etherate and heating the 1.1.3.5-tetraethoxy-2.6-dimethyl-octene-(6)-acid-(8) ethyl ester thus obtained with benzene and about one molecule of water in the presence of a sulfonic acid of the benzene series until no more alcohol is split off.

8. A process for the production of 2.6-dimethyl-octatriene-(2.4.6)-al-(1)-acid-(8) ethyl ester which consists in adding while excluding water propenyl ethyl ether into a mixture of 1.1-diethoxy-4-methyl-hexadiene-(2.4)-acid-(6) ethyl ester and about one percent of boron trifluoride etherate and heating the 1.1.3-triethoxy-2.6-dimethyl-octadiene-(4.6)-acid-(8) ethyl ester thus obtained with benzene and about one molecule of water in the presence of a sulfonic acid of the benzene series until no more alcohol is split off.

References Cited in the file of this patent

UNITED STATES PATENTS 2,555,600 Newman _____ June 5, 1951
2,586,305 Copenhaver _____ Feb. 19, 1952
2,730,549 Isler et al. _____ Jan. 10, 1956

OTHER REFERENCES

Wittig et al.: Chem. Berichte, 87, 1954, pp. 1318–1330.

Chem. Abstr., vol. 48, 1954, p. 1963d.